(12) United States Patent
Ryan (10) Patent No.: US 10,430,673 B2
(45) Date of Patent: Oct. 1, 2019

(54) SYSTEMS AND METHODS FOR OBJECT CLASSIFICATION IN AUTONOMOUS VEHICLES

(71) Applicant: GM GLOBAL TECHNOLOGY OPERATIONS LLC, Detroit, MI (US)

(72) Inventor: Lawrence Oliver Ryan, Menlo Park, CA (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 246 days.

(21) Appl. No.: 15/653,952

(22) Filed: Jul. 19, 2017

(65) Prior Publication Data

US 2019/0026571 A1    Jan. 24, 2019

(51) Int. Cl.

| | | |
|---|---|---|
| G05D 1/00 | (2006.01) | |
| G06K 9/00 | (2006.01) | |
| G08G 1/0962 | (2006.01) | |
| G06K 9/48 | (2006.01) | |
| G01C 21/26 | (2006.01) | |
| G08G 1/0967 | (2006.01) | |

(52) U.S. Cl.
CPC ......... G06K 9/00805 (2013.01); G06K 9/48 (2013.01); G08G 1/09626 (2013.01); *G01C 21/26* (2013.01); *G06K 9/00* (2013.01); *G08G 1/096725* (2013.01)

(58) Field of Classification Search
USPC ........................................... 701/26
See application file for complete search history.

(56) References Cited

U.S. PATENT DOCUMENTS

| | | | | |
|---|---|---|---|---|
| 2008/0107345 | A1* | 5/2008 | Melikian | G06K 9/00818 382/209 |
| 2013/0197736 | A1* | 8/2013 | Zhu | G05D 1/0088 701/26 |
| 2016/0003954 | A1* | 1/2016 | Broussard, III | G01V 1/003 244/76 R |
| 2016/0358475 | A1* | 12/2016 | Prokhorov | G05D 1/0011 |

* cited by examiner

*Primary Examiner* — Masud Ahmed
(74) *Attorney, Agent, or Firm* — Lorenz & Kopf, LLP (57) ABSTRACT

Systems and method are provided for controlling a vehicle. In one embodiment, an object classification method includes receiving sensor data associated with an object observed by a sensor system of an autonomous vehicle and determining, with a processor, a bounding curve associated with the sensor data. A plurality of bounding curve features are determined based on a set of convexities and concavities associated with the bounding curve. The object is classified by applying the plurality of bounding curve features to a machine learning model and receiving a classification output.

18 Claims, 8 Drawing Sheets

SYSTEMS AND METHODS FOR OBJECT CLASSIFICATION IN AUTONOMOUS VEHICLES

TECHNICAL FIELD

The present disclosure generally relates to autonomous vehicles, and more particularly relates to systems and methods for classifying objects observed by various sensors of an autonomous vehicle.

BACKGROUND

An autonomous vehicle (AV) is a vehicle that is capable of sensing its environment and navigating with little or no user input. It does so by employing sensing devices such as radar, lidar, image sensors, and the like. Autonomous vehicles further use information from global positioning systems (GPS) technology, navigation systems, vehicle-to-vehicle communication, vehicle-to-infrastructure technology, and/or drive-by-wire systems to navigate the vehicle.

While recent years have seen significant advancements in AVs, such systems might still be improved in a number of respects. For example, it would be advantageous for an AV to be capable of more accurately classifying an object sensed in its surroundings—e.g., whether an object sensed in the environment is a human being, an automotive vehicle, or the like.

Accordingly, it is desirable to provide systems and methods that are capable of more accurately classifying objects sensed in the environment. Furthermore, other desirable features and characteristics of the present invention will become apparent from the subsequent detailed description and the appended claims, taken in conjunction with the accompanying drawings and the foregoing technical field and background.

SUMMARY

Systems and method are provided for controlling an autonomous vehicle. In one embodiment, an object classification method includes receiving sensor data associated with an object observed by a sensor system of an autonomous vehicle and determining, with a processor, a bounding curve associated with the sensor data. The method further includes determining a plurality of bounding curve features based on a set of convexities and concavities associated with the bounding curve and classifying the object by applying the plurality of bounding curve features to a machine learning model and receiving a classification output that classifies the object for assisting in control of the autonomous vehicle.

In one embodiment, a system for controlling a vehicle includes an object classification module, including a processor. The object classification module is configured to receive sensor data associated with an object observed by a sensor system of an autonomous vehicle; determine a bounding curve associated with the sensor data; determine a plurality of bounding curve features based on a set of convexities and concavities associated with the bounding curve; and classify the object by applying the plurality of bounding curve features to a machine learning model that classifies the object for assisting in control of the autonomous vehicle.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, autonomous vehicles, machine learning, image analysis, neural networks, lidar, analytical geometry, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
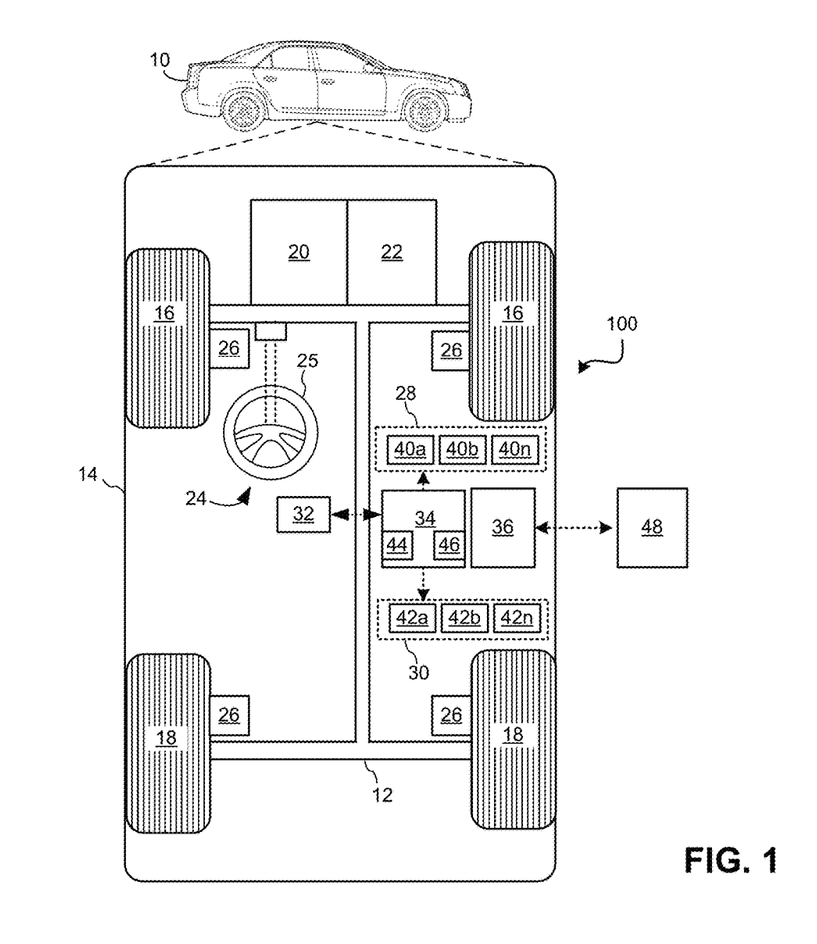
FIG. 1 is a functional block diagram illustrating an autonomous vehicle including a system in accordance with various embodiments.

With reference to FIG. 1, an object classification system (or simply "system") 100 is associated with an autonomous vehicle (AV) 10 in accordance with various embodiments. In general, object classification system 100 includes a machine learning (ML) model (e.g., a neural network) capable of classifying objects in the vicinity of vehicle 10 based on the bounding curves of those objects—e.g., the attributes of the various "bulges" and "plunges" (also referred to, respectively, as "convexities" and "concavities") observed in the bounding curve (or "contour"). These attributes, or features, might include the gradient of the bounding curve between adjacent convexities and concavities. The attributes might also include the distance between adjacent convexities and concavities, the elevation (based on some appropriate ground reference) of those convexities and concavities, and any other geometric features that might be used to train a neural network or other classification-type ML model. The resulting ML model may be distributed to any number of vehicles, and may be automatically updated at regular or configurable intervals.

Referring now to FIG. 1, an autonomous vehicle ("AV" or simply "vehicle") 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, vehicle 10 is an autonomous vehicle and object classification system 100 is incorporated into the autonomous vehicle 10. The autonomous vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, etc., can also be used.

In an exemplary embodiment, the autonomous vehicle 10 corresponds to a level four or level five automation system under the Society of Automotive Engineers (SAE) "J3016" standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, that the embodiments in accordance with the present subject matter are not limited to any particular taxonomy or rubric of automation categories. Furthermore, systems and methods in accordance with the present embodiment may be used in conjunction with any autonomous vehicle that utilizes a navigation system to provide route guidance.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n might include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, autonomous vehicle 10 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. Route information may also be stored within data device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chip set), any combination thereof, or generally any device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals that are transmitted to the actuator system 30 to automatically control the components of the autonomous vehicle 10 based on the logic, calculations, methods, and/or algorithms. Although only one controller 34 is shown in FIG. 1, embodiments of the autonomous vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10. In one embodiment, as discussed in detail below, controller 34 is configured to classify objects in the environment using an ML model that has been previously trained based on the nature of the bounding curve associated with such objects.

Figure 2:
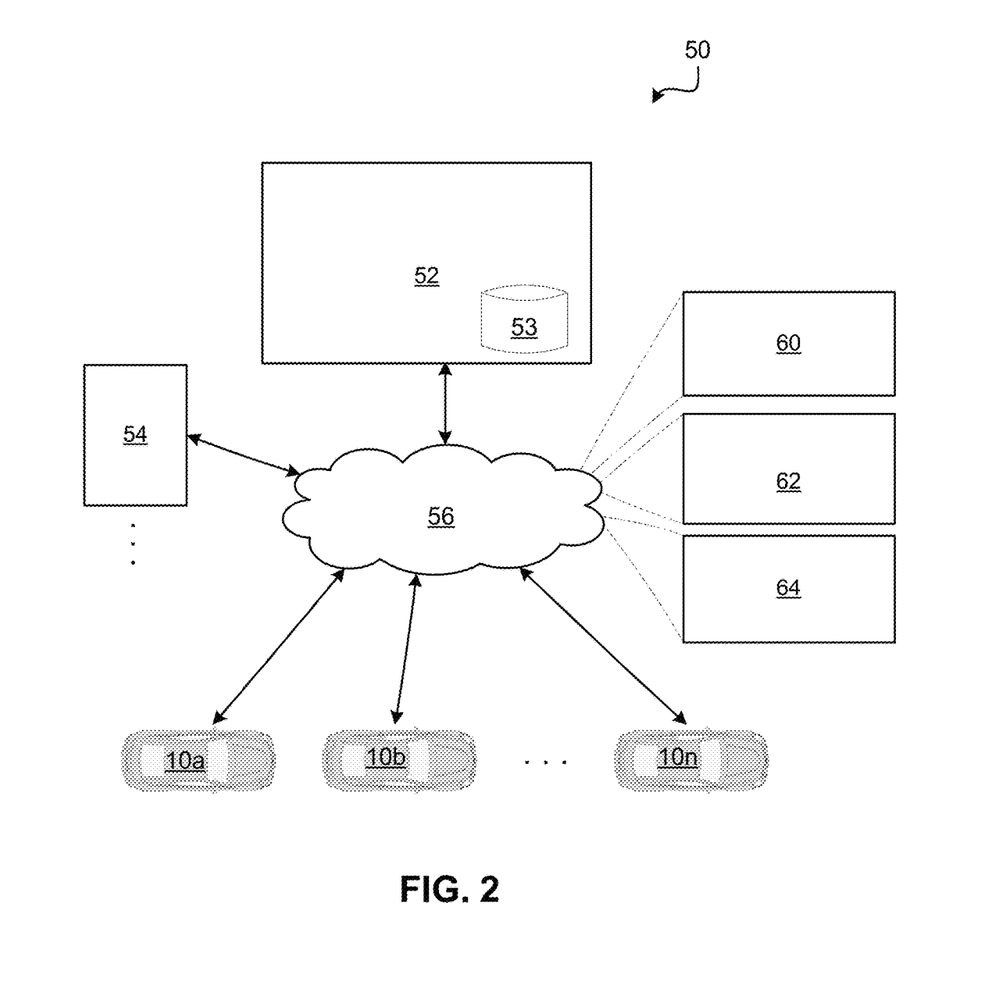
FIG. 2 is a functional block diagram illustrating a transportation system having one or more autonomous vehicles as shown in FIG. 1, in accordance with various embodiments.

The communication system 36 is configured to wirelessly communicate information to and from other entities 48, such as but not limited to, other vehicles ("V2V" communication), infrastructure ("V2I" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system (or simply "remote transportation system") 52 that is associated with one or more autonomous vehicles 10*a*-10*n* as described with regard to FIG. 1. In various embodiments, the operating environment 50 (all or a part of which may correspond to entities 48 shown in FIG. 1) further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 may include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10*a*-10*n*. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a component of a home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, not shown), which may be cloud-based, network-based, or resident at the particular campus or geographical location serviced by the remote transportation system 52. The remote transportation system 52 can be manned by a live advisor, an automated advisor, an artificial intelligence system, or a combination thereof. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, biometric data, behavioral patterns, and other pertinent subscriber information. In one embodiment, as described in further detail below, remote transportation system 52 includes a route database 53 that stores information relating to navigational system routes.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
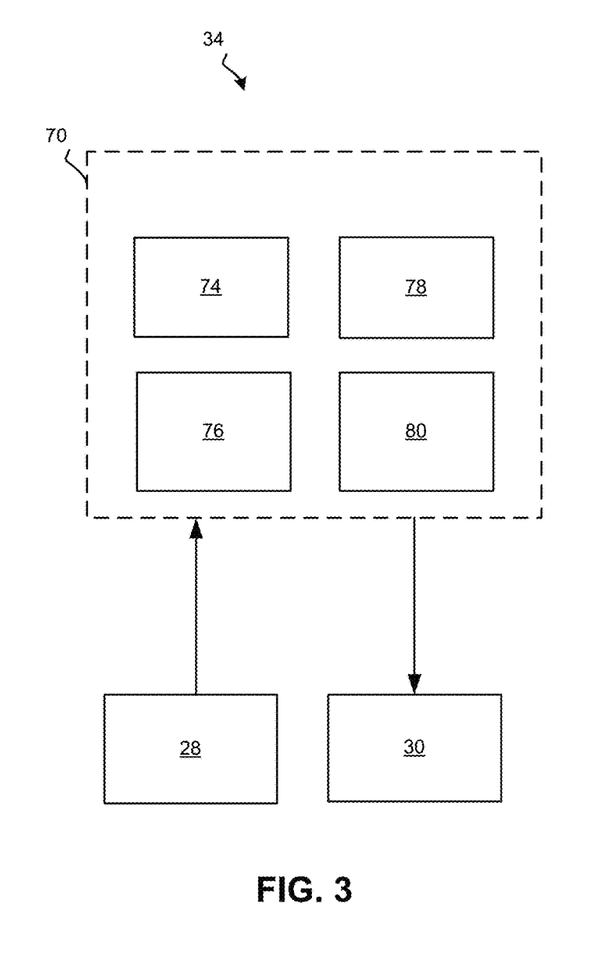
FIG. 3 is functional block diagram illustrating an autonomous driving system (ADS) associated with an autonomous vehicle, in accordance with various embodiments.

In accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10.

In various embodiments, the instructions of the autonomous driving system 70 may be organized by function or system. For example, as shown in FIG. 3, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 10. In various embodiments, the sensor fusion system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, system 100 of FIG. 1 is capable of classifying objects in the vicinity of vehicle 10 based on the bounding curves of those objects. In various embodiments, classification is performed based on the attributes of the various "bulges" and "plunges" (also referred to, respectively, as "convexities" and "concavities") observed in the bounding curve of the object. These attributes, or features, might including the gradient of the bounding curve between adjacent convexities and concavities, the distance between adjacent convexities and concavities, the elevation of those convexities and concavities, and any other geometric features that might be used to train a neural network or other classification-type ML model.

Figure 4:
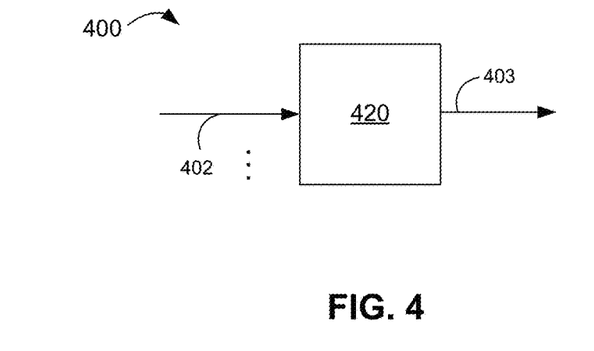
FIG. 4 is a dataflow diagram illustrating an object classification system in accordance with various embodiments.
Figure 5:
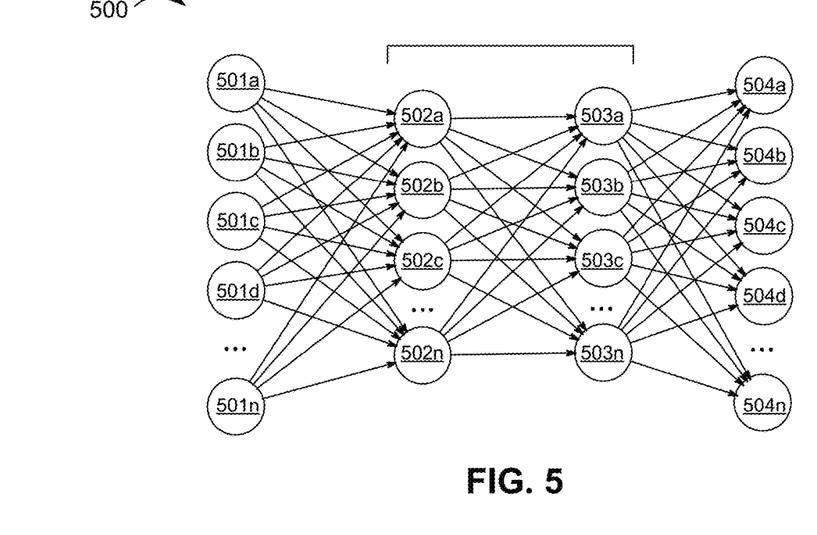
FIG. 5 is a conceptual block diagram of an artificial neural network (ANN) in accordance with various embodiments.

FIG. 4 is a dataflow diagram that illustrates various embodiments of the system 100 which may be embedded within the controller 34. Referring to FIG. 5, an exemplary system generally includes an object classification module 420 that receives sensor data 402 relating to the vehicle's environment (e.g., camera images, lidar data, or any other sensor data received from sensor system 28) and has, as its output 403, a determination as to the class (or category) of the various objects detected in the vehicles environment. In various embodiments, module 420 implements an ML model that has been previously trained using a corpus of example images (e.g., examples images of known object types).

It will be understood that various embodiments of the system 100 according to the present disclosure can include any number of sub-modules embedded within the controller 34. As can be appreciated, then, any modules/sub-modules shown in FIG. 4 can be combined and/or further partitioned to similarly perform the various methods described herein. Inputs to the system 100 may be received from the sensor system 28, received from other control modules (not shown) associated with the autonomous vehicle 10, received from the communication system 36, and/or determined/modeled by other sub-modules (not shown) within the controller 34 of FIG. 1. Module 420 may be implemented, for example, within any of the various modules illustrated in FIG. 3.

Object classification module 420 may implement a variety of machine learning methodologies, such as an artificial neural network that undergoes training using a set of images previously acquired and stored (e.g., in server 53 of FIG. 2). In that regard, FIG. 5 is a conceptual overview of an artificial neural network (ANN) configuration 500 that might be used in connection with various embodiments. In general, ANNs such as that shown in FIG. 5 are mathematical models (implemented using any suitable combination of hardware and/or software) that to some extent mimic the neuronal structure of the mammalian cerebral cortex.

ANN 500 includes a number of input nodes 501 (e.g., 501a-501n), a number of output nodes 504 (e.g., 504a-504n), and one or more interconnected layers of nodes configured as "hidden layers" (in this case, two hidden layers: nodes 502a-502n and nodes 503a-503n). Each of the layers of nodes 502, 503, and 504 receives input from previous layers via a network of weighted connections (illustrated as arrows in FIG. 5). Each of the nodes have a corresponding "activation function," which will generally vary depending upon the particular application. Input (in the form of visual patterns, numeric features, etc.) is presented to ANN 500 via the input layer (nodes 501), which communicates with hidden layer or layers (nodes 502 and 503), where the actual "learning" is accomplished during training. The hidden layers (nodes 502 and 503) link to an output layer (nodes 504).

ANN 500 is "trained" via learning rule which modifies the weights of the connections according to the input patterns provided to input layer 501, thereby allowing ANN 500 to learn by example. Such learning may be supervised (with known examples provided as input), unsupervised (with uncategorized examples provided as input), or involve reinforcement learning (where some notion of "reward" is provided during training). Once a neural network is 'trained' to a satisfactory level it may be used as an analytical tool to make predictions. That is, new inputs are presented to the input nodes 501 where they filter into and are processed by the middle layers 502-503 as though training were taking place; however, at this point the output of a forward propagation run is the predicted model for the input data which can then be used for further analysis and interpretation.

As will be described in detail below, ANN 500 of FIG. 5 may be used to implement classification module 420 of FIG. 4 by accepting inputs 501 corresponding to attributes of the various convexities and concavities of an observed object's bounding curve and producing as an output (504) a classification of the one or more observed objects. For example, output 504a may correspond to a "human being" classification (along with some confidence score associated with that classification), output 504b may correspond to a "motorcycle" classification, output 504c may correspond to a "vehicle" classification, etc. These classifications are not meant to be limiting, however, and might include any number of object types typically observed by AV 10 during operation, such as cars, trucks, strollers, bicycles, human beings, dogs, light poles, and the like.

It will be appreciated that the present embodiments are not limited to the ANN model 500 described above. A variety of machine learning techniques may be used, including, for example, other artificial neural networks, such as recurrent neural networks (RNN), as well as random forest classifiers, Bayes classifiers (e.g., naive Bayes), principal component analysis (PCA), support vector machines, linear discriminant analysis, and the like.

Figure 6:
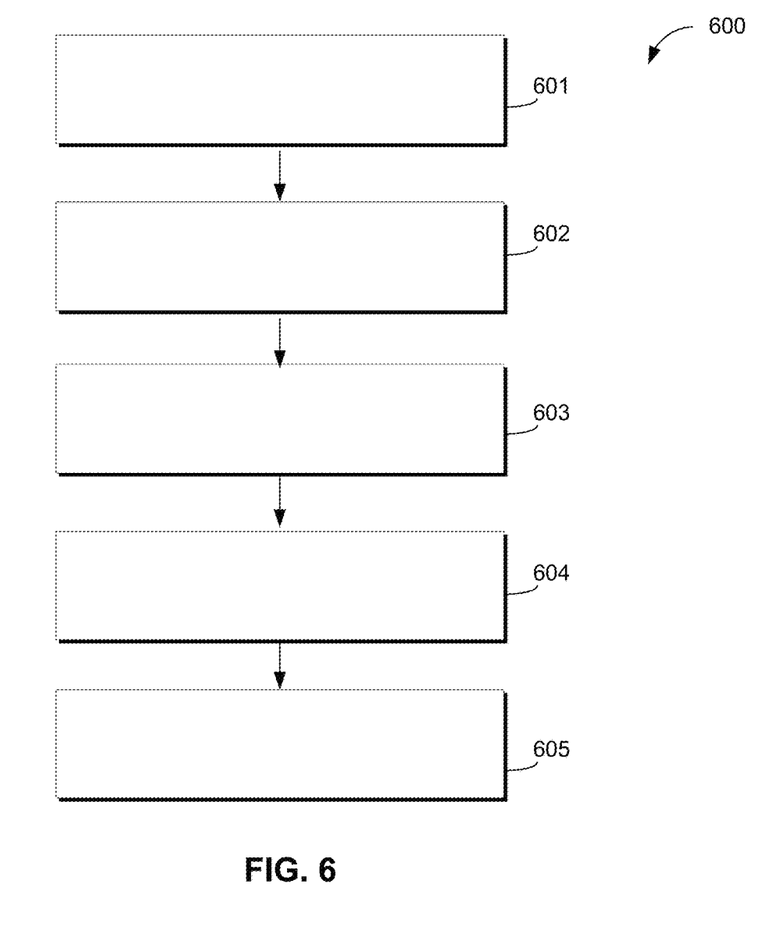
FIG. 6 is a flowchart illustrating a control method for object classification in accordance with various embodiments.
Figure 7:
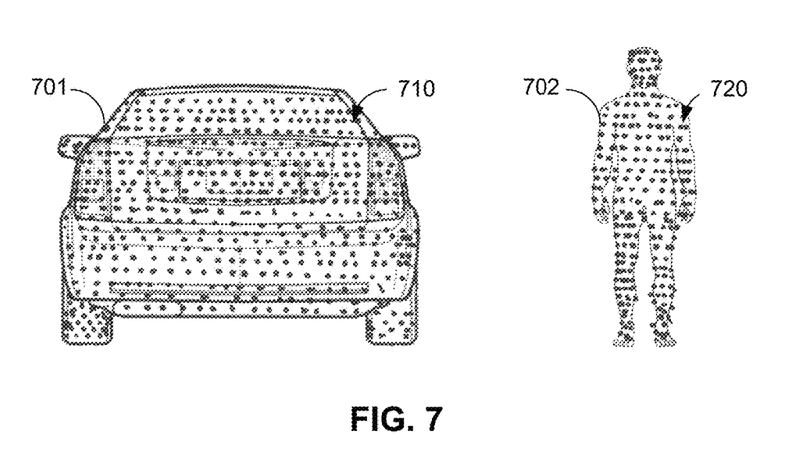
FIG. 7 illustrates various bounding curves corresponding to example point clouds in accordance with various embodiments.
Figure 8:
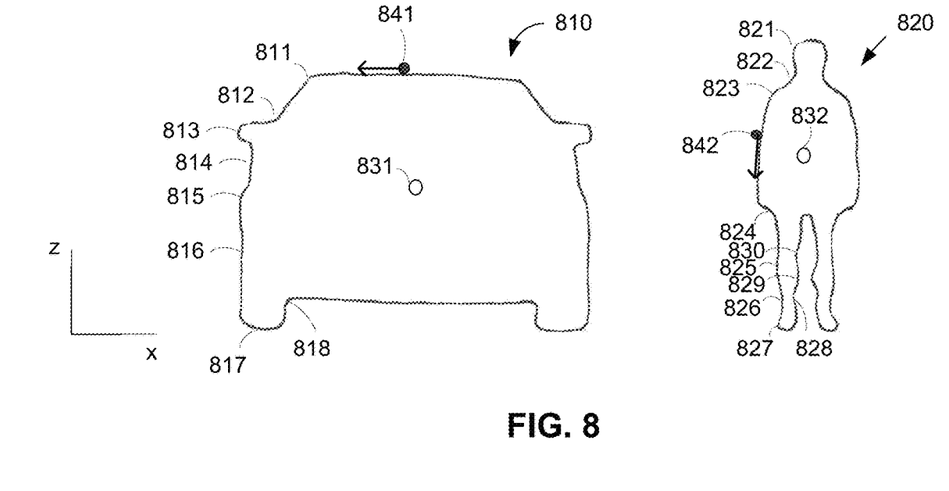
FIG. 8 illustrates the bounding curves of FIG. 7 with various corresponding convexities and concavities.
Figure 9:
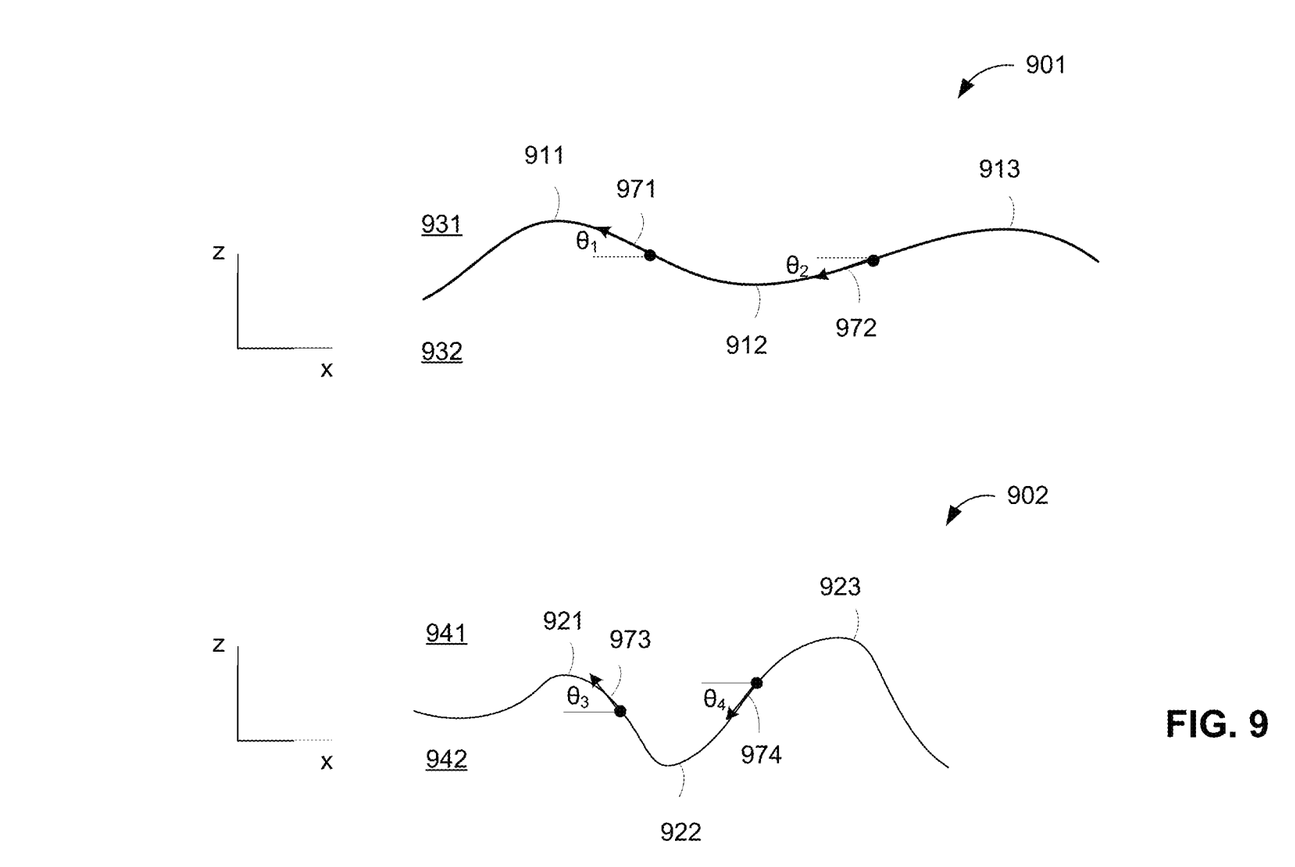
FIG. 9 illustrates the extraction of features from a portion of example bounding curves in accordance with various embodiments.
Figure 10:
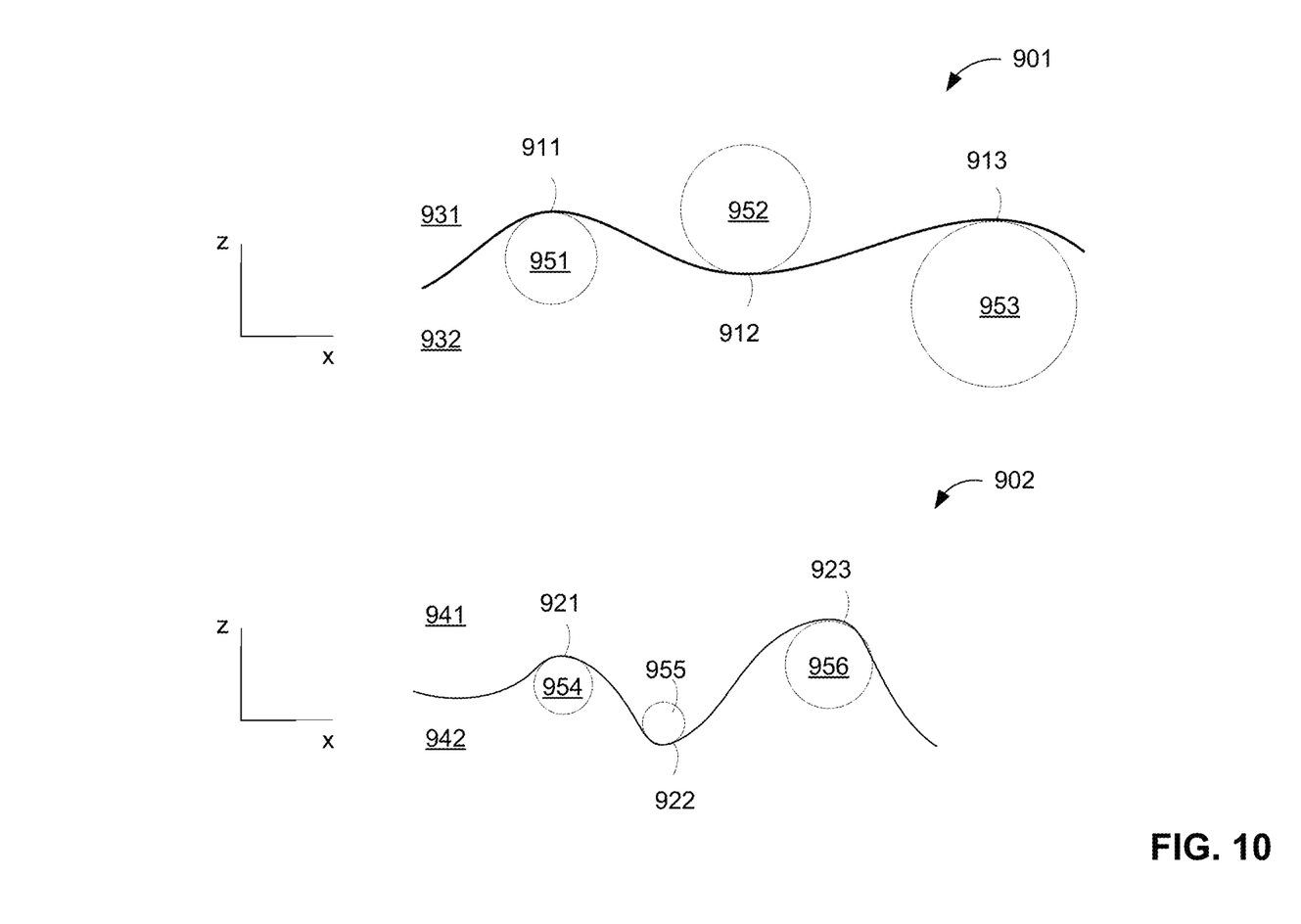
FIG. 10 illustrates the extraction of features from a portion of example bounding curves in accordance with various embodiments.

FIG. 6 is a flowchart illustrating a control method for object classification in accordance with various embodiments, and will be described now in conjunction with FIGS. 1-5 as well as FIGS. 7-10. In general, and as described in further detail below, FIG. 7 illustrates various bounding curves corresponding to example point clouds in accordance with various embodiments. FIG. 8 illustrates the bounding curves of FIG. 7 with various corresponding convexities and concavities, and FIGS. 9-10 illustrate the extraction of features from a portion of example bounding curves in accordance with various embodiments.

Referring now to FIG. 6, a control method 600 can be performed by the system 100 of FIG. 1 in conjunction with the object classification module 420 of FIG. 4. As will be appreciated in light of the disclosure, the order of operation within method 600 is not limited to the sequential execution as illustrated in FIG. 6, but may be performed in one or more varying orders as applicable and in accordance with the present disclosure.

Control method 600 begins at 601 with the training of a machine learning model based on a set (or "corpus") of training data. As described in connection with the ANN 500 of FIG. 5, this corpus of training data might include a large set of images including objects that are likely to be encountered by AV 10 (e.g., various vehicles, human beings, etc.) along with known classifications associated with those images. This training step 601 will generally include determining the bounding curve of the objects as well as feature extraction, which will be described in further detail below. Once the ANN has been trained (which will generally be performed within a system external to AV 10), the model can then be provided (e.g., via communication network 56) to one or more vehicles (e.g., AV 10).

Next, at 602, sensor data is acquired by the AV 10. As mentioned above, the sensor data might include any available data acquired by sensor system 28 during operation of AV 10. In various embodiments, optical camera data and lidar data are of particular interest in the object classification process. Nevertheless, any available sensor data may be used.

A bounding curve associated with the acquired sensor data is then determined at 603. As used herein, the term "bounding curve" refers to a curve that substantially corresponds to the outline of an object within the field of view of the sensors used to acquire the sensor data. FIG. 7, for example, illustrates a lidar cloud 710 corresponding to the returns from the rear of a vehicle alongside a lidar cloud 720 corresponding to the returns from a pedestrian (as might be viewed from the standpoint of AV 10). An example bounding curve 701 as illustrated substantially corresponds to the outline of the (vehicle) lidar point cloud 710, while a bounding curve 702 substantially corresponds to the outline of the (human) lidar point cloud 720.

While the bounding curves 701 and 702 shown in FIGS. 7 and 8 are illustrated as closed curves, the subject matter described herein is not so limited. In some embodiments, the bounding curve may only partially encompass an object, and therefore will be an open curve. Depending upon the nature of the object, the nature of the sensor data, and other factors, the bounding curve may be continuous or discontinuous, smooth (i.e., continuously differentiable) or unsmooth, rectilinear (e.g., polygonal) or curvilinear, etc. Further, the bounding curve need not include all sensor data associated with an object, and may be an approximation derived from any suitable algorithm known in the art (e.g., edge detection algorithms used in the field of optical image analysis). Thus, in general, the nature of a bounding curve may vary to a large extent, as long as suitable features of the curve may be extracted in order to effectively train an ML model to classify the corresponding objects.

Next, at 604, the bounding curve determined at 603 is characterized (i.e., features of the bounding curve are extracted) based on the convexities and concavities observed within the bounding curve. Referring now to FIG. 8, the bounding curves 701 and 702 of FIG. 7 are shown as bounding curves 810 and 820. In these examples, as described above, bounding curves 810 and 820 are closed, non-self-intersecting continuous loops in a plane (e.g., "simple closed curves" or "Jordan" curves) having a corresponding interiors and exteriors, as will be apparent in the figures. Each of the bounding curves 810 and 820 may be characterized by a respective centroid 831 and 832.

In various embodiments, bounding curves 810 and 820 are characterized by their respective sets of concavities and convexities (also referred to as "plunges" and "bulges", respectively). Concavities generally correspond, intuitively, to curve segments that "open outward" (i.e., away from the interior of the bounding curve), while convexities generally correspond to curve segments that "open inward" (i.e., toward the interior of the bounding curve).

Referring to bounding curve 810 of FIG. 8, for example, a number of alternating convexities and concavities are shown, including convexities 811, 813, 815, and 817, and concavities 812, 814, 816, and 818. In the interest of clarity (given its symmetry), only half of bounding curve 810 is characterized in this figure. Similarly, bounding curve 820 includes convexities 821, 823, 825, 827, and 829, and concavities 822, 824, 826, and 828.

In accordance with various embodiments, the properties of the convexities and concavities associated with bounding curves 810 and 820 are extracted in a way that allows a properly trained ANN to distinguish between a vehicle (represented by bounding curve 810) and a human (represented by bounding curve 820). The extracted features associated with a given bounding curve may be represented as a vector of real numbers, integers, or other appropriate variable types used as inputs to the ML model (e.g., inputs 501*a-n* of FIG. 5).

In some embodiments (using bounding curve 810 as a non-limiting example) the extracted features include, for each of the concavities and convexities (811-818), the elevation (i.e., distance along the z-axis) of the corresponding concavity/convexity. Thus, convexity 811 has a greater elevation than convexity 813, convexity 813 has a greater elevation than convexity 815, and so on. This feature corresponds, intuitively, to the observation that certain classes of objects will generally be "taller" (as viewed by AV 10) than other objects. That is, the concavities/convexities of a conventional, mid-sized sedan will, on average, be located at a greater elevation than those of a typical baby stroller.

In some embodiments, the gradient between adjacent convexities/concavities is used as an extracted feature. This feature corresponds, intuitively, to the idea that certain objects (such as human beings) will generally include a number of closely spaced and "deep" concavities while others (such as motor vehicles) will generally include fewer, more widely-spaced concavities. In this regard, the term "widely-spaced" refers to some distance along the bounding curve itself. Consider, for example, a point 841 as shown on bounding curve 810 traveling (in this case counterclockwise) around bounding curve 810. The parametric distance traveled by this point as it progresses around bounding curve 810 may be referred to herein as a distance s (to distinguish it from other distances within the Cartesian frame shown in FIG. 8). The same applies to point 842 of bounding curve 820, as illustrated.

The nature of such "gradients" is further shown in FIG. 9, which illustrates two example bounding curves: 901 (*top*) and 902 (*bottom*). In the interest of simplicity, the curves in FIG. 9 are shown "unwrapped" and placed in a Cartesian coordinate system, rather than a polar coordinate system as might be more natural for a bounding curve that largely encircles an object. That is, while the gradients may be expressed below in the context of a Cartesian coordinate system (e.g., dz/dx), it will be understood that the same principles of curvature and slope apply in a polar coordinate system (e.g., dr/dθ).

Bounding curve 901, which might correspond to the contours of a vehicle, has an interior 932, an exterior 931, and includes convexity 911, concavity 912, and convexity 913. Similarly, bounding curve 902, which might correspond to the contours of a human being, has an interior 942, an exterior 941, and includes convexity 921, concavity 922, and convexity 923.

Referring to bounding curve 901 of FIG. 9, it can be seen that the transition from convexity 911 to concavity 912 can be characterized by a tangent vector 971 having an angle $\theta_1$, and the transition from concavity 912 to convexity 913 can be characterized by a tangent vector 972 having an angle $\theta_2$. Similarly, with respect to bounding curve 902, it can be seen that the transition from convexity 921 to concavity 922 can be characterized by a tangent vector 973 having an angle $\theta_3$, and the transition from concavity 922 to convexity 923 can be characterized by a tangent vector 974 having an angle $\theta_4$.

Thus, it can be seen that gradients 971 and 972 vary less (and have a lower magnitude) than those of gradients 973 and 974. Further, the distance between adjacent convexities (i.e., as separated by an intervening concavity) is also generally greater in bounding curve 901 than in bounding curve 902. Thus, the magnitude of these gradients and distances (and others between successive convexities and concavities) can be used as extractable features to be fed into ANN 500.

FIG. 10 shows yet another way to characterize the bounding curves 901 and 902 shown in FIG. 9. That is, the radius of curvature at points along each curve 901, 902 may be computed using standard algorithms that, for example, fit a circle to each inflexion point and then use the radius of each circle to characterize curvature. In FIG. 10, for example, bounding curve 901 is characterized by circles 951, 952, and 953, while bounding curve 902 is characterized by circles 954, 955, and 956. The curvatures of these circles can be used as extracted features for ANN 500 of FIG. 5. As is plain in FIG. 10, the radii of circles 951, 952, and 953 are, on average, greater than that of circles 954, 955, and 956.

Referring again to FIG. 6, at 605 the object is classified by the ML model using the features extracted at 604. As mentioned above in connection with FIG. 5, in one embodiment this classification will generally include feeding the extracted bounding curve features into the inputs 501 of the ANN 500 of FIG. 5, and then utilizing the outputs 504 to determine the likelihood that various classes of objects are within the field of view of AV 10 while it is moving within its environment.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An object classification method comprising:
    receiving lidar point cloud data associated with an object observed by a sensor system of an autonomous vehicle;
    determining, with a processor, a bounding curve as an outline of the object in the lidar point cloud data and having a plurality of curve segments;
    determining, with the processor, a feature vector for each of the plurality of curve segments based on convexities and concavities associated with the bounding curve; and
    classifying, with the processor, the object by applying the feature vectors to a machine learning model and receiving a classification output that classifies the object for assisting in control of the autonomous vehicle.

2. The method of claim 1, wherein the machine learning model is an artificial neural network model.

3. The method of claim 1, further including transmitting the machine learning model to the autonomous vehicle over a communication network.

4. The method of claim 1, wherein the feature vectors include gradients between adjacent convexities and concavities.

5. The method of claim 1, wherein the feature vectors include the elevation of each of the convexities and concavities.

6. The method of claim 1, wherein the feature vectors include the radius of curvature of each of the convexities and concavities.

7. The method of claim 1, wherein the feature vectors features include the distance between adjacent convexities.

8. A system for controlling an autonomous vehicle, comprising:
    an object classification module, including a processor, configured to:
    receive lidar point cloud data associated with an object observed by a sensor system of an autonomous vehicle;
    determine a bounding curve as an outline of the object in the lidar point cloud data and having a plurality of curve segments;
    determine a feature vector for each of the plurality of curve segments based on convexities and concavities associated with the bounding curve; and
    classify the object by applying the feature vectors to a machine learning model.

9. The system of claim 8, wherein the machine learning model is an artificial neural network model.

10. The system of claim 8, wherein the feature vectors include gradients between adjacent convexities and concavities.

11. The system of claim 8, wherein the feature vectors include the elevation of each of the convexities and concavities.

12. The system of claim 8, wherein the feature vectors include the radius of curvature of each of the convexities and concavities.

13. The system of claim 8, wherein the feature vectors include the distance between adjacent convexities.

14. An autonomous vehicle, comprising:
    at least one sensor that provides lidar point cloud data; and
    a controller that, by a processor and based on the lidar point cloud data:
    receives the lidar point cloud data associated with an object observed by the at least one sensor;
    determines a bounding curve associated with the sensor data;
    determines a feature vector for each of the plurality of curve segments based on convexities and concavities associated with the bounding curve; and
    classifies the object by applying the feature vectors to a machine learning model.

15. The autonomous vehicle of claim 14, wherein the machine learning model is an artificial neural network model.

16. The autonomous vehicle of claim 14, wherein the feature vectors include gradients between adjacent convexities and concavities.

17. The autonomous vehicle of claim 14, wherein the feature vectors include the elevation of each of the convexities and concavities.

18. The autonomous vehicle of claim 14, wherein the feature vectors include the radius of curvature of each of the convexities and concavities.

* * * * *